US008674813B2

(12) United States Patent
Alexander et al.

(10) Patent No.: US 8,674,813 B2
(45) Date of Patent: Mar. 18, 2014

(54) METHOD AND APPARATUS FOR COMMUNICATION BETWEEN A REMOTE DEVICE AND AN OPERATOR

(76) Inventors: John F. Alexander, Gainesville, FL (US); Matthew Mahin, Gainesville, FL (US); Donald Oldham, Gainesville, FL (US); Matthew Tyson, Gainesville, FL (US); Gerry King, Gainesville, FL (US)

(*) Notice: Subject to any disclaimer, the term of this patent is extended or adjusted under 35 U.S.C. 154(b) by 1258 days.

(21) Appl. No.: 12/406,810

(22) Filed: Mar. 18, 2009

(65) Prior Publication Data

US 2009/0262002 A1    Oct. 22, 2009

Related U.S. Application Data

(60) Provisional application No. 61/037,653, filed on Mar. 18, 2008.

(51) Int. Cl.
*G08C 19/16* (2006.01)

(52) U.S. Cl.
USPC ........................................................ 340/12.1

(58) Field of Classification Search
USPC ..................... 340/12.22, 3.1, 5.61
See application file for complete search history.

(56) References Cited

U.S. PATENT DOCUMENTS

| | | | | |
|---|---|---|---|---|
| 5,671,158 A * | 9/1997 | Fournier et al. | ............... | 701/29.6 |
| 5,739,747 A * | 4/1998 | Flick | ......................... | 340/426.15 |
| 5,905,432 A * | 5/1999 | Greene | .................... | 340/426.13 |
| 6,083,353 A | 7/2000 | Alexander, Jr. | | |
| 6,166,627 A * | 12/2000 | Reeley | ...................... | 340/426.25 |
| 6,389,332 B1 * | 5/2002 | Hess et al. | ........................ | 701/1 |
| 6,587,276 B2 | 7/2003 | Daniell | | |
| 7,196,621 B2 * | 3/2007 | Kochis | ..................... | 340/539.13 |
| 7,898,386 B2 * | 3/2011 | Wisnia | ......................... | 340/5.62 |
| 2003/0016130 A1 * | 1/2003 | Joao | .............................. | 340/539 |

* cited by examiner

*Primary Examiner* — Vernal Brown
(74) *Attorney, Agent, or Firm* — Saliwanchik, Lloyd & Eisenschenk (57) ABSTRACT

Sensors can be positioned on or near a remotely controlled device to monitor the status and/or internal conditions of the device and transmit the status information through a data link to a control station, where the information can be provided to a user or operator via sensory stimulation signals. Such sensory stimulation signals can include auditory stimulation signals that can convey the information to the user while allowing the user to maintain visual attention on the remote device. The sensor information can be transmitted as digital information from the remote station to a control station, where it is converted to sensory stimulation signals, such as sounds, which can include tones, alarms, speech, other audible sounds, or combinations thereof. An operator controlling the remote device can, upon receiving the sensory stimulation signals, provide input signals for controlling the remote device.

59 Claims, 9 Drawing Sheets

METHOD AND APPARATUS FOR COMMUNICATION BETWEEN A REMOTE DEVICE AND AN OPERATOR

CROSS-REFERENCE TO RELATED APPLICATION(S)

The present application claims the benefit of U.S. Provisional Application Ser. No. 61/037,653, filed Mar. 18, 2008, which is hereby incorporated by reference herein in its entirety, including any figures, tables, or drawings.

BACKGROUND OF INVENTION

The operation of remote devices, such as remote vehicles, whether scale model or full-size, is sometimes assisted by having a transmitter in the remote device that returns data from various types of sensors installed in and around the vehicle to monitor various statuses and conditions. Such systems are generally referred to as telemetry systems. The information provided by telemetry systems is usually displayed visually as alphanumeric and/or graphic displays.

For certain types of remote devices, the visual display of information can be problematic for an operator. Many such remote devices require the operator to maintain constant visual contact, which can prevent the operator from visually interpreting the information returned from the telemetry system. Furthermore, operators with impaired vision may not be able to read the visual display of information. Thus, their control of a remote device can be limited by the lack of information pertaining to the status and conditions of the device.

The operation of remote devices could be improved with the use of a telemetry system that can translate data from the device into an audio format presented to the operator. This would allow the operator of a remote device to receive and interpret information and data from a remote device while maintaining visual contact with the device.

BRIEF SUMMARY

Embodiments of the present invention relate to a communication system that can report the conditions in and/or around a remote vehicle to an operator. Specific embodiments can report the conditions using audio and/or voice messages. In a specific embodiment, the audio signals can be computer generated. Embodiments of the subject invention can utilize a remote station having various sensors and monitors for detecting and reporting the conditions and/or status of the remote device. A data encoding system and data link electronics allow the values of the conditions to be transmitted to a control station. The control station can employ a sensory stimulation system, such as an audio generation system, and data link electronics to receive data packets from the remote station and translate them into an operator discernable format if needed. The sensory stimulation provided to the user or operator can include one or more of the following: touch, sound, smell, and visual stimulation. In further specific embodiments, touch stimulation can include vibration, temperature, and/or pressure; auditory stimulation can include music, tones (20 to 20 khz), buzzers, Doppler tones, and/or vehicle sounds/emulations; and visual stimulation can include lights (such as colors, flashing, steady), alphanumeric display (such as numbers and alphabet), and/or symbols (such as vehicle rendition displays showing critical points and or systems).

The remote station can be mounted in or on the remote vehicle, and can utilize sensors to gather information about the conditions in and/or around the vehicle, including, but not limited to, battery levels, airspeed, motor currents, motor or other sounds, position, heading, fuel levels, propeller RPM, air temperature, water temperature, light levels, data link signal strength, motor RPM, GPS position, timer/clock, current consumption, battery Level (%), battery voltage, battery Current, ground speed, altitude, direction(vector), turn and bank, pitch and roll, motor or engine temperature, battery temperature, climb rate, decent rate, angle of attack, stall warning, turbulence, G force, cavitation monitor, acceleration, deceleration, servo/activator current monitor, and a variety of other conditions or situations. This information can be encoded and transmitted to the control station. The transmission of information between the remote station and the control station can be accomplished by a variety of methods utilizing optical and/or radio links between the stations.

The abilities of the remote station are limited only by the multitude of different types of sensors utilized with the device to obtain the desired information about the type of device being monitored by the system. The remote station can be equipped with a data storage device for recording and logging the sensor data output during the extent of a mission. Data could then be retrieved and reviewed at a later time, for example, when the remote station is connected to a personal computer system or by way of a removable memory component. The stored data could then be displayed graphically or alphanumerically on a computer display, or it can be presented in an audio format, alone or concurrent with the visual display.

The types of sensors utilized can depend upon several factors and can further be changed, altered, or added to the remote station, as necessary. To accommodate such changes and the change or addition of sensors, the remote station could have one or more accessory expansion ports for the addition of other sensors, such as, for example, sensors that are tailored to the specific remote device.

Upon receipt of the encoded information, the control station can convert the data to sensory stimulation signals, such as an audio format or audio signals. Examples of audio signals include tones, sounds, phonetics, words, or combinations thereof, that can be presented to and understood and/or interpreted by the operator. The audio signals are able to give the user a clear understanding of the conditions and/or status of operation in the remote device without directing visual attention from the device and its movements.

A control station, or receiver station, can be utilized by the operator to receive information that can be used to assist in the direction and control of the remote device. The control station, like the remote station, can employ a selection of options for management of incoming messages and data. For example, the control station can be equipped with a computer interface and/or interface port that allows the display and management of messages and data. Such management could include, but is not limited to, language selection, message priorities, upgrading of the device computer codes, or the setting of special thresholds for alarm conditions.

One advantage of the subject invention is that the control station can translate the data into an audio format that can include speech, or speech components, sounds or sound effects that reflect or correlate to the performance of the vehicle. The operator, upon receiving and interpreting the audio format, is able react and direct the device accordingly. Currently, many remote devices are controlled utilizing radio links. For example, model scale vehicles are usually radio link controlled by an operator. Such pre-existing control links can be used with the subject invention, where encoding methods and voice synthesis are added. Furthermore, information from the remote station can be utilized with the existing radio link to limit the operator control inputs to the remote device, which in some instances can prevent damage or loss of control.

Embodiments of the subject invention can also be used to locate a lost or disabled remote controlled device. Embodiments for locating a lost or disabled remote device need not include a sensor on the remote device, but can emit a signal that can be detected to locate the device. In further embodiments, onboard sensor(s), such as GPS sensors, can report through the data link connection the position or location of the device, and the signal can be optically directionally detected.

Embodiments can allow the user or operator to provide sensory input to the receiver station, or control station, to provide input for controlling the remote device. Such sensory input can include, but is not limited to, voice commands, pushing buttons/switches, body or body part positioning. As an example, hands raised or head tilted in a certain way can be used to signal where a user is looking or positioned.

A further unique advantage of embodiments of the subject invention is enabling, or enhancing the ability of a person with impaired vision to operate a vehicle remotely.

BRIEF DESCRIPTION OF DRAWINGS

In order that a more precise understanding of the above recited invention be obtained, a more particular description of the invention briefly described above will be rendered by reference to specific embodiments thereof that are illustrated in the appended drawings. Understanding that these drawings depict only typical embodiments of the invention and are not therefore to be considered as limiting in scope, the invention will be described and explained with additional specificity and detail through the use of the accompanying drawings in which.

DETAILED DISCLOSURE

Embodiments of the subject invention pertain to a method and apparatus for communication between a remote device and an operator. Specific embodiments of the subject invention pertain to a control system, or similar device, capable of providing sensory stimulation information to an operator.

The operation of a remote device, such as a remote vehicle, is usually accomplished with the use of communication systems that transmit information back and forth between the device and a control system. The remote device can be, for example, a remote control airplane, a remote control boat, or a remote control car or other ground vehicle. An operator utilizing a control system can operate the remote device through the wireless connection of the communication system. Often, the remote devices are configured with sensors that can detect information about the device and/or the surrounding environment and relay that information to the control device. The operator receives the information from the control device usually by means of a visual device, such as a monitor or screen, and can react accordingly. The visual presentation of the information requires that the operator divide their attention between the visual device displaying the information and the operation of the remote device. This can be undesirable or dangerous in certain situations and with certain types of remote vehicles.

Embodiments of the present invention relate to a remotely operated device 20 and a control station 40 having a communication link, such as a wireless communication link 40 therebetween, such as a data link, or other operable connection. Conditions in and/or around the remote device 20 can be reported to an operator 15 using sensory stimulation such as audible tones, sounds, phonetics, and/or speech and/or other sensory stimulations such as visual, smell, and touch. With reference to the attached figures, which show certain embodiments of the subject invention, it can be seen that certain embodiments of subject invention utilize a remote station 30 to collect information from one or more sensors 35 located on and/or around the vehicle. The information is transmitted, via the wireless link 40, to a control, or receiver, station 50 that converts the information from the sensors 35 into sensory stimulation signals, such as audio signals, that can be perceived by the operator.

Figure 1:
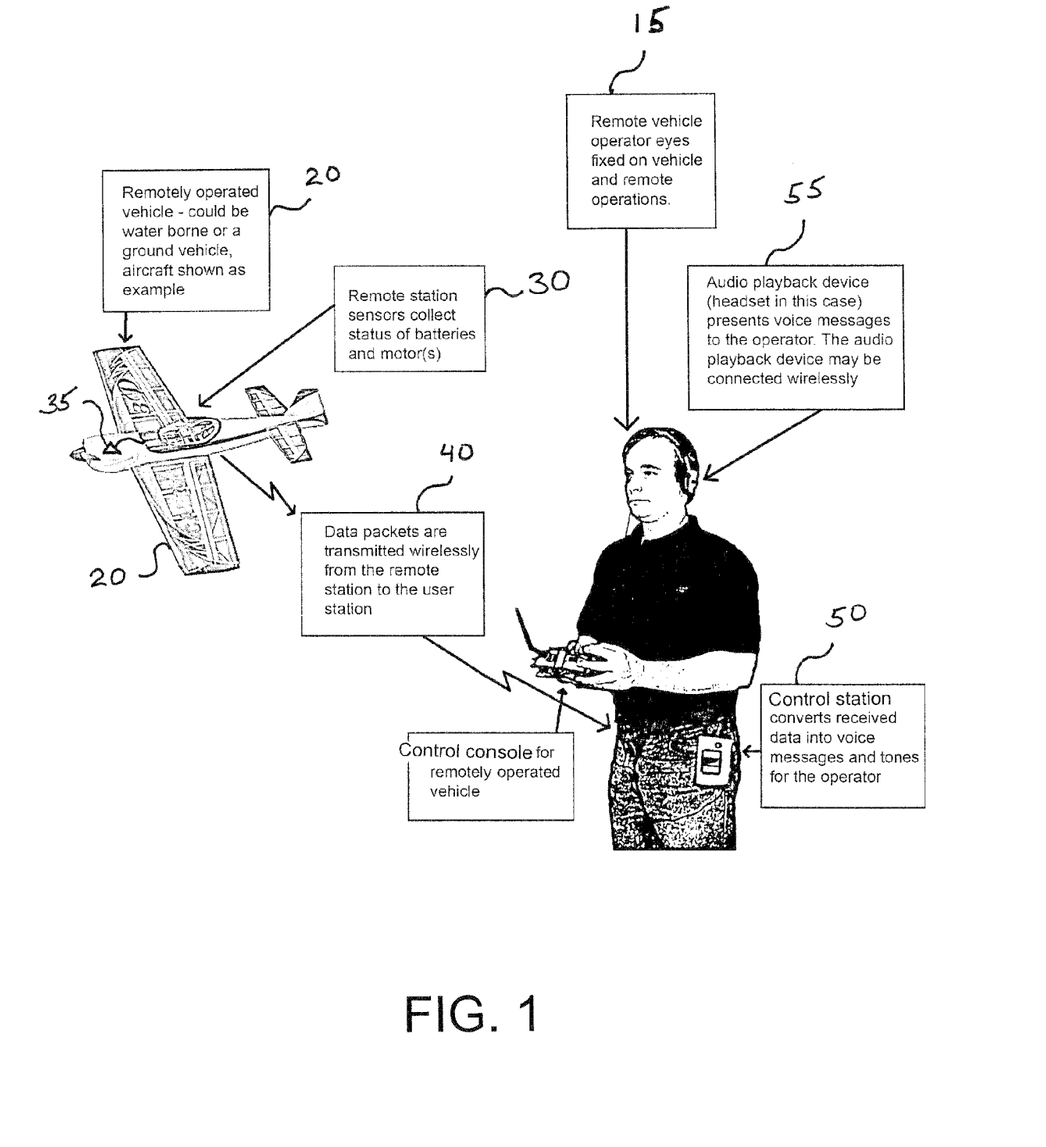
FIG. 1 shows an illustration of an embodiment of a system of the subject invention in operation.

FIG. 1 shows an embodiment of the subject invention. In this embodiment, a model airplane is being operated remotely by way of a control console in the operator's hands. A control station, or receiver station, is worn at the waist, while a remote station is in operable connected to the airplane. The control station can be positioned in other locations on the operator, such as in the headset, or locations separate from the operator, such as in an automobile or separate housing. A headset being worn by the operator is in operable communication with the control station. In this embodiment, the headset can be used by the operator to hear the voice and/or sound reports of conditions in the vehicle, such as, for example, battery or motor status, received from the remote station. Other apparatus can be positioned with respect to the operator to provide other sensory stimulations such as vibrations, smells, or visual signals.

Figure 2:
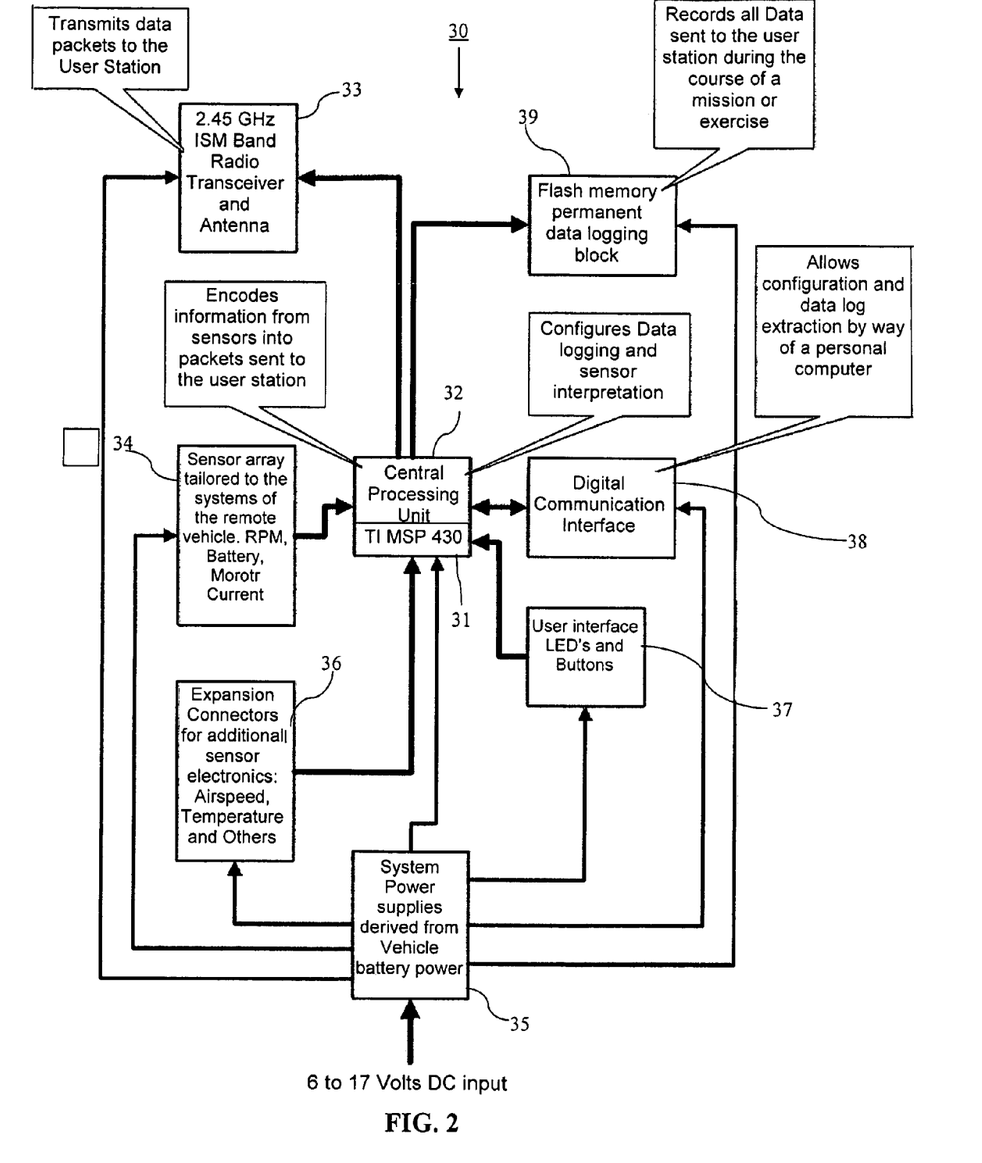
FIG. 2 shows a block diagram of an embodiment of a remote station of the subject invention, where one or more sensors in and/or around the remote device transmit data and information to a remote station central processing unit (CPU), and the CPU packages the information, so the information can be transmitted to the control station.

A remote station 30 of the subject invention can employ a central processing unit (CPU) 32, such as, for example a microprocessor, to receive information from one or more of any of a variety of sensors 34 positioned in and around the remote device 20, as shown, for example, in FIG. 2. In a specific embodiment, the remote station uses a Texas Instruments MSP430 microprocessor, with a sensor interface 60, such as the one shown, for example, in FIG. 4. However, a person with skill in the art would be able to determine alternative microprocessors or CPU that could be utilized with the subject invention and such variations are considered to be within the scope of the subject invention.

In one embodiment, an array of sensors 34 is utilized with the remote device. Sensors 34 are designed and configured to obtain information regarding the status and/or condition of the remote device. For example, fuel levels, fluid levels, speed, temperature, location, distance traveled, battery levels, time in operation, and other information or combinations thereof can all be detected by one or more sensors. A person with skill in the art would be able to determine the appropriate sensors for use in a particular remote device, and the pertinent information to relay to the CPU 32.

FIG. 2 shows the component structure of one embodiment of a remote station 30 of the subject invention. In this embodiment, sensors 34 include a current monitor that can sense the amount of current being consumed by the motor(s) of the mobile or remote device, a system battery monitor that can detect the cumulative power draw of the system and be used to inform that the system is near failure or damage due to low battery levels, a voltage level for the system batteries. In a still further embodiment, the system battery monitor can detect fuel supply temperature. In a specific embodiment, an aircraft RPM (revolutions per minute) monitor can be utilized as part of the component system. An aircraft RPM monitor can be an optical, electrical, and/or magnetic sensor that senses rotation, and is used to determine if mechanical devices are operating at their specified parameters. The various sensor limits and operating parameters can be specified by the user or the device manufacturer.

In a further embodiment, sensor expansion connectors 36 are also utilized with the remote device of the subject invention. Sensor expansion connectors 36 allow for additional sensors 34b to be added to the remote device. The sensors can be added independently or as part of a sensor array in the remote device. In a further embodiment, the sensor expansion connector 36 is used to attach sensors specific to the remote device.

To operate, most sensors require a power supply 35, particularly if they are transmitting information. In one embodiment, shown, for example, in FIG. 2, the remote station operates with the power supply 35 of the remote device. In a further embodiment, the remote station operates over a wide range of power supply 35 conditions, allowing flexibility of installation. In specific embodiment, the remote station 30 is designed for low average power usage, which extends the acceptable range of system power conditions. In a more specific embodiment, a remote station of the subject invention operates with an input voltage of up to 25V. In an alternative embodiment, modern automotive and harsh environment implementations can require the device to accept a power supply 35 of 50V or higher.

Figure 6:
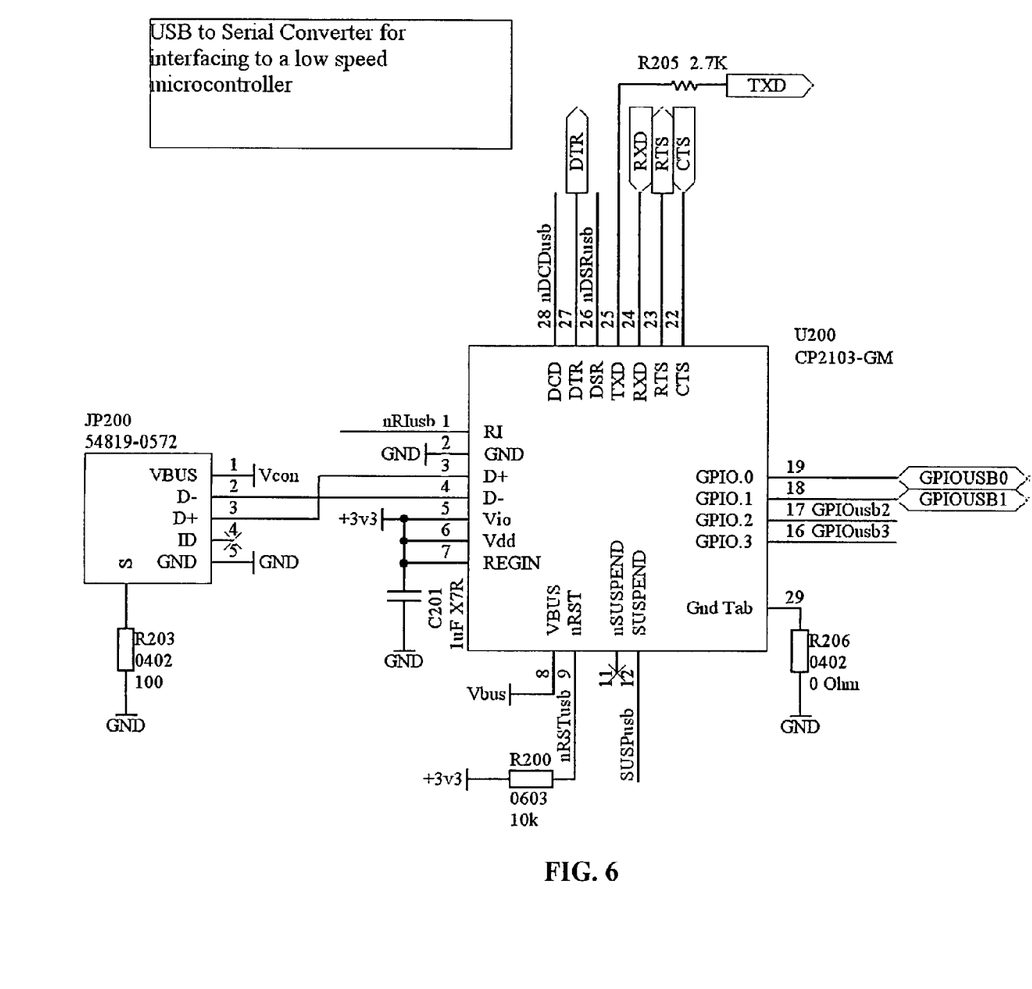
FIG. 6 shows a schematic of an embodiment of a communications interface of the Remote Station and the control station, in accordance with the subject invention.
Figure 9:
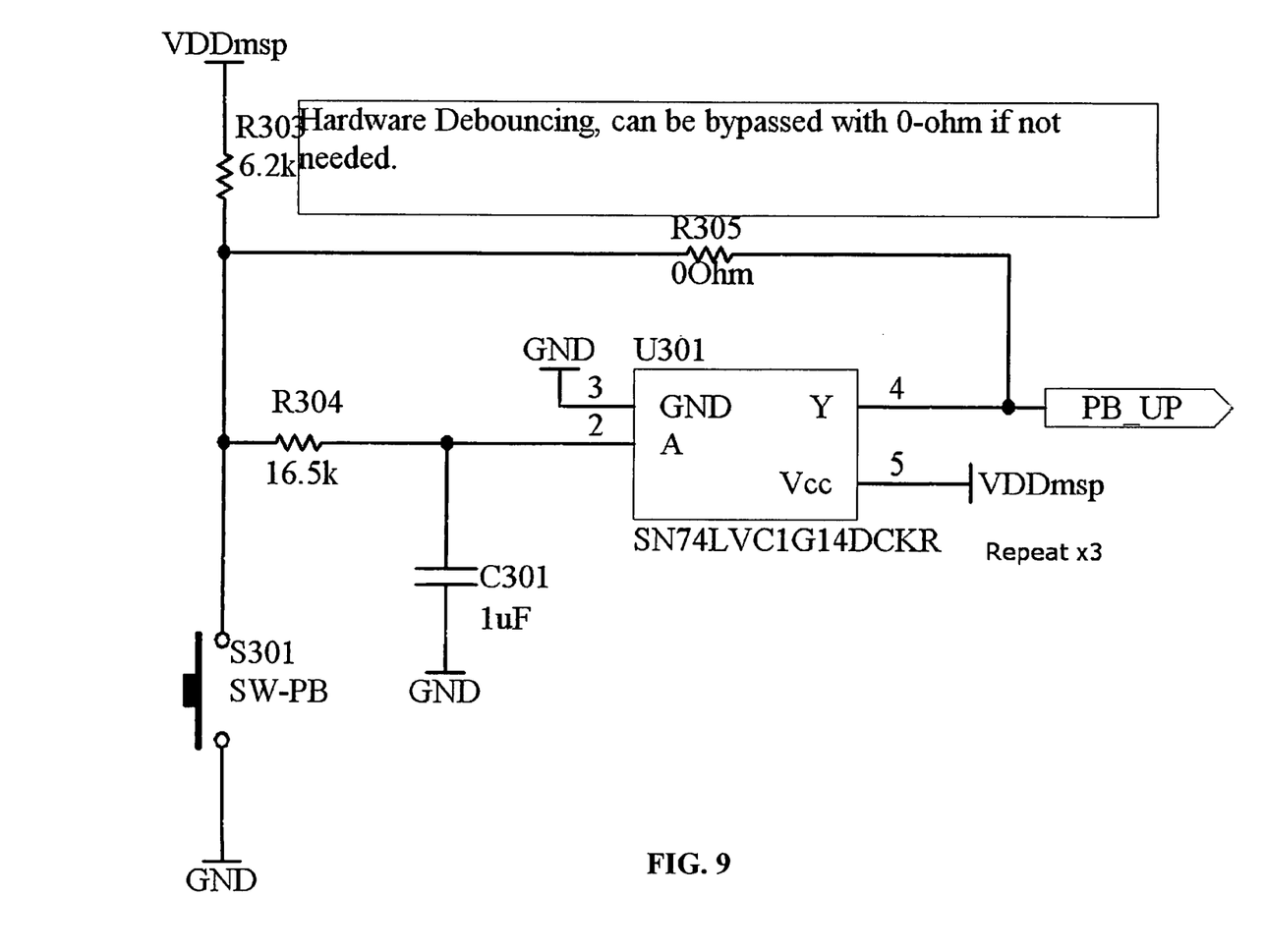
FIG. 9 shows a schematic of an embodiment of a pushbutton interface of a control station, in accordance with the subject invention.

In a further embodiment, an example of which is also shown in FIG. 2, the remote station implements a user interface 37. The user interface 37 can employ any of a variety of J/O devices for displaying information, adjusting or altering parameters or operations of the remote station, as well as other functions known to those with skill in the art. FIG. 9 illustrates one embodiment of a pushbutton interface 70 that can be utilized with a user interface 37. In one embodiment, the user interface 37 utilizes push buttons and/or visible indicators, such as, for example, light emitting diodes (LED) to input and display information, such as for example, the current operational state of the remote device 20. In a further embodiment, a pushbutton is used for designating and coordinating multiple systems in a shared environment. This can permit several operators to work in close proximity without interference of the wireless connections 40. The LED indicators can show an installer and the operator that the system is functioning properly. In a further embodiment, the LED indicators show also that the control station is connected to the intended remote device In a further embodiment, a communication interface 38 can be utilized with the remote station 30, as shown, for example, in FIGS. 2 and 6. A communication interface 38 can be utilized to connect to any information retrieval or input device. In a particular embodiment, a digital communication interface 38 is used with a universal serial bus (USB) port for communications with a personal computer (PC), personal digital assistant (PDA), and any other system which implements a USB port. In a further particular embodiment, the communications interface 38 employs a joint test action group (JTAG) port, which can be used, among other purposes, to monitor the microprocessor directly. The communications interface can also be used to communicate with peripherals using serial peripheral interface (SPI) compatible protocol, inter-integrated circuit (I2C) compatible protocols, as well as arbitrary digital and analog communication protocols. The flexibility of the communications port is advantageous for a device that may be installed in many systems that may have a standard communication protocol as an important component of the system operation. Thus, a person with skill in the art would be able to determine alternative communication ports and protocols useful for the specific remote device and control station configurations utilized with the subject invention. Such alternative embodiments are considered to be within the scope of the subject invention.

For some remote devices, it can be desirable or necessary to maintain a record of all, or at least some, of the data obtained during operation of the remote device. There are a variety of devices and techniques known to those with skill in the art for recording, storing, and keeping logs and data files of the operational status and conditions and other information pertaining to a remote device and its operation. In one embodiment, the data is transmitted to a remote CPU accessible memory location, away from the remote device, for recording and storage. In an alternative embodiment, data is directly transmitted to CPU accessible memory aboard the remote device. In a specific embodiment, data is stored on resident non-volatile memory 39, maintained aboard the remote device. FIG. 2 shows an embodiment of a remote station implementing a resident non-volatile memory, such as a flash memory storage device. As with other resident non-volatile memory 39, the flash memory can be used to save diverse types of information and data, including, for example, user settings, sensor data, and environmental information, combinations thereof, or other information. One advantage of maintaining an onboard record of data is that, in the event data is not successfully transmitted through the radio frequency link, it can still be recorded via the hardwiring for later retrieval and analysis. Thus, in the specific embodiment disclosed above, in the event of a communications loss, the flash memory or other non-volatile memory 39 can be used to store and retrieve data that may be necessary to determine the cause of device malfunction, and to prevent it in the future. In an embodiment, data is also stored in memory at the remote device for later retrieval.

Figure 7:
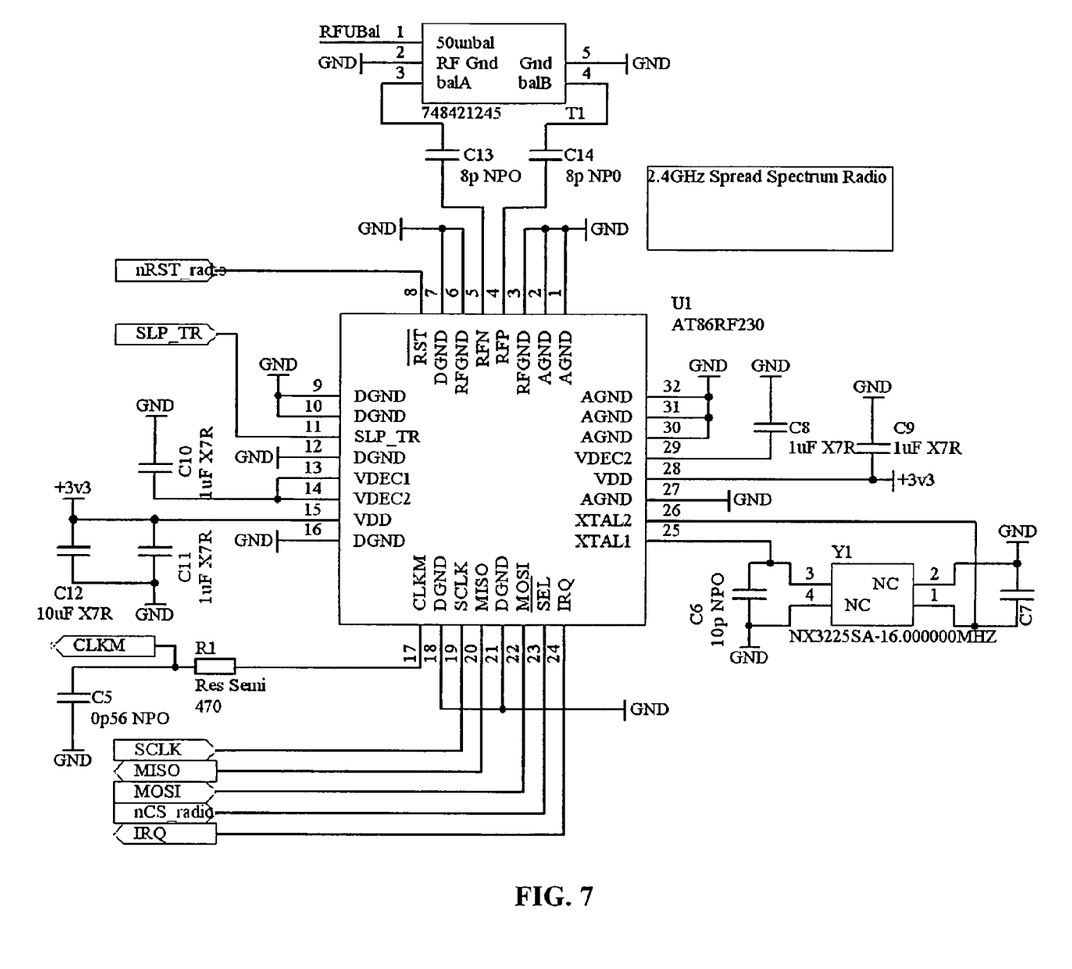
FIG. 7 shows a schematic of an embodiment of a radio frequency communications system of the remote station and control station, in accordance with the subject invention.

In a further embodiment, the remote station of the subject invention utilizes a radio frequency transceiver 33, as shown, for example, in FIGS. 2 and 7. The functions of the transceiver can be performed by a transmitter and a receiver as well. In this embodiment, the radio frequency transceiver 33 is used for communication between the remote station 30 and the control station 50. In a particular embodiment, the remote station uses an integrated antenna for portability and mechanical reasons. It would be within the skill of a person trained in the art, to create an integrated transceiver, or alternative transceivers, for use with the subject invention. Such alternatives are contemplated to be within the scope of the subject invention.

Figure 4:
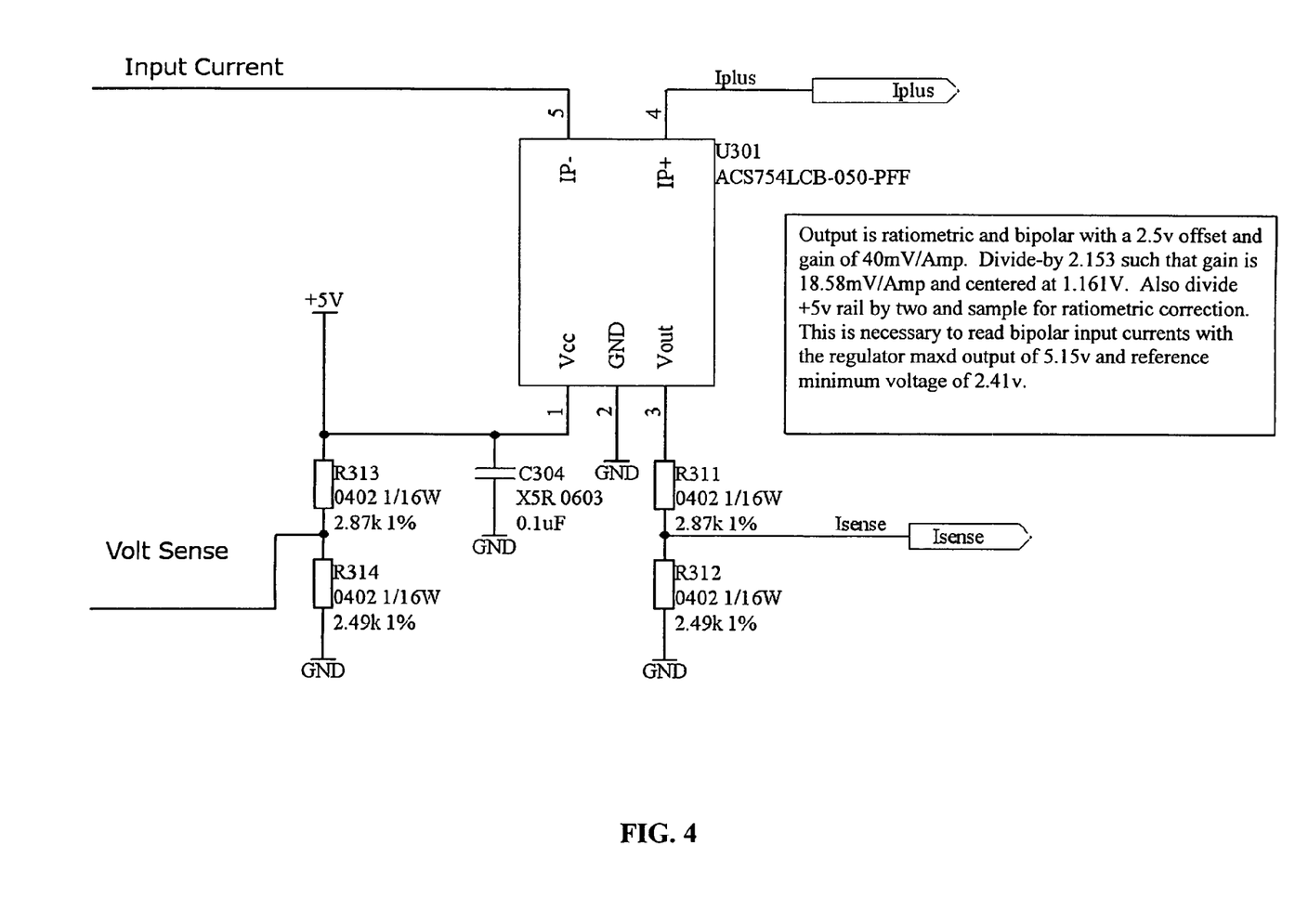
FIG. 4 shows a schematic of an embodiment of a sensor interface of the remote station, in accordance with the subject invention.
Figure 5:
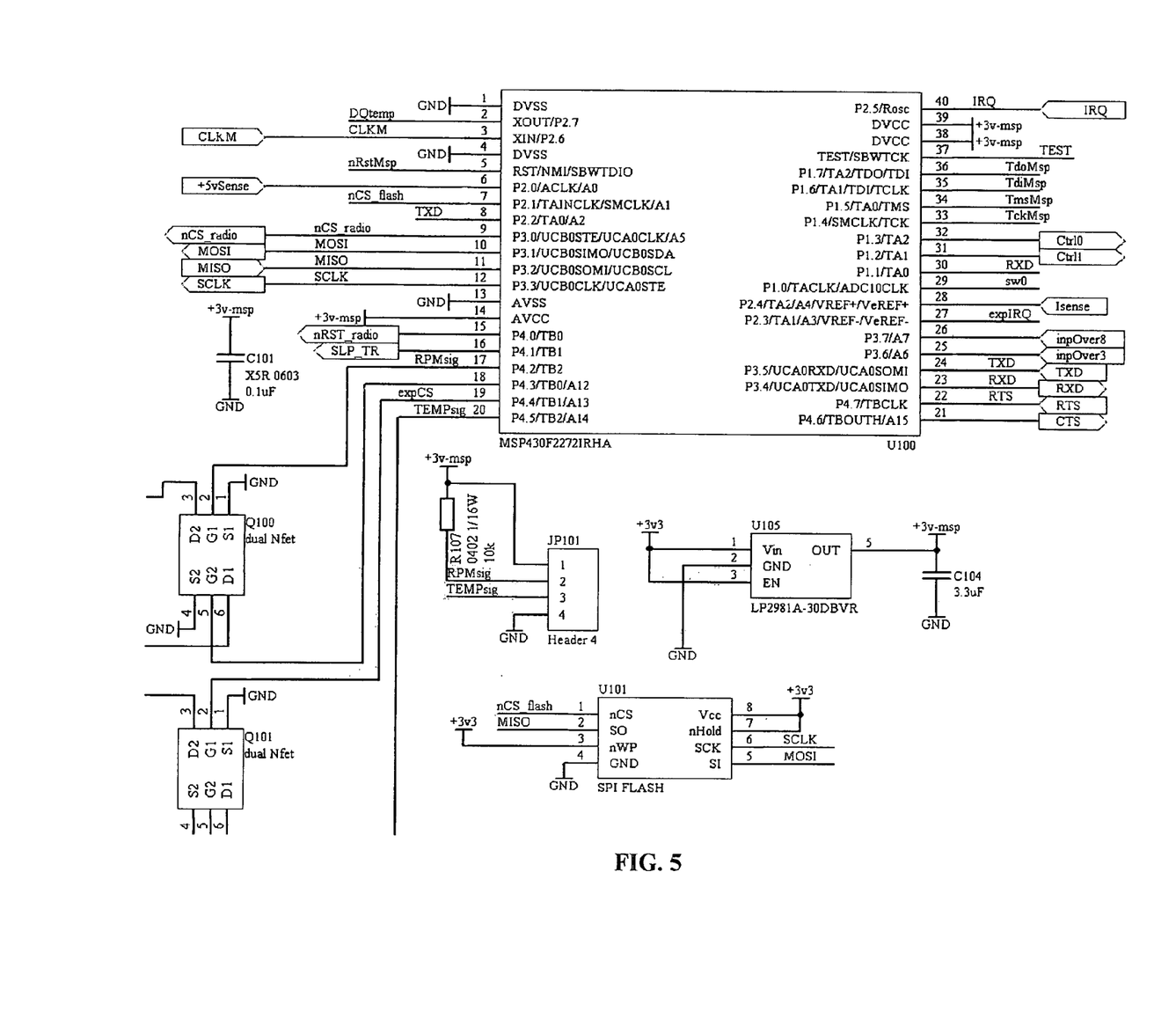
FIG. 5 shows a schematic of an embodiment of a microcontroller of the remote station, in accordance with the subject invention.

As mentioned above, in one embodiment, the remote station includes a microprocessor 31, as shown, for example, in FIGS. 2 and 5, in conjunction with a sensor interface 60, as shown, for example, in FIG. 4. The microprocessor can be used to time the sensor readings and radio communications. In a farther embodiment, the microprocessor controls the flow of data to the nonvolatile memory, such as flash memory. The microcontroller can also be used to implement the user interface 37; and, farther, to control the appropriate system modification due to user inputs and environmental inputs. The use of microprocessors is well-known in the art and any and all modifications useful with the subject invention are contemplated to be within the scope of this application.

Figure 3:
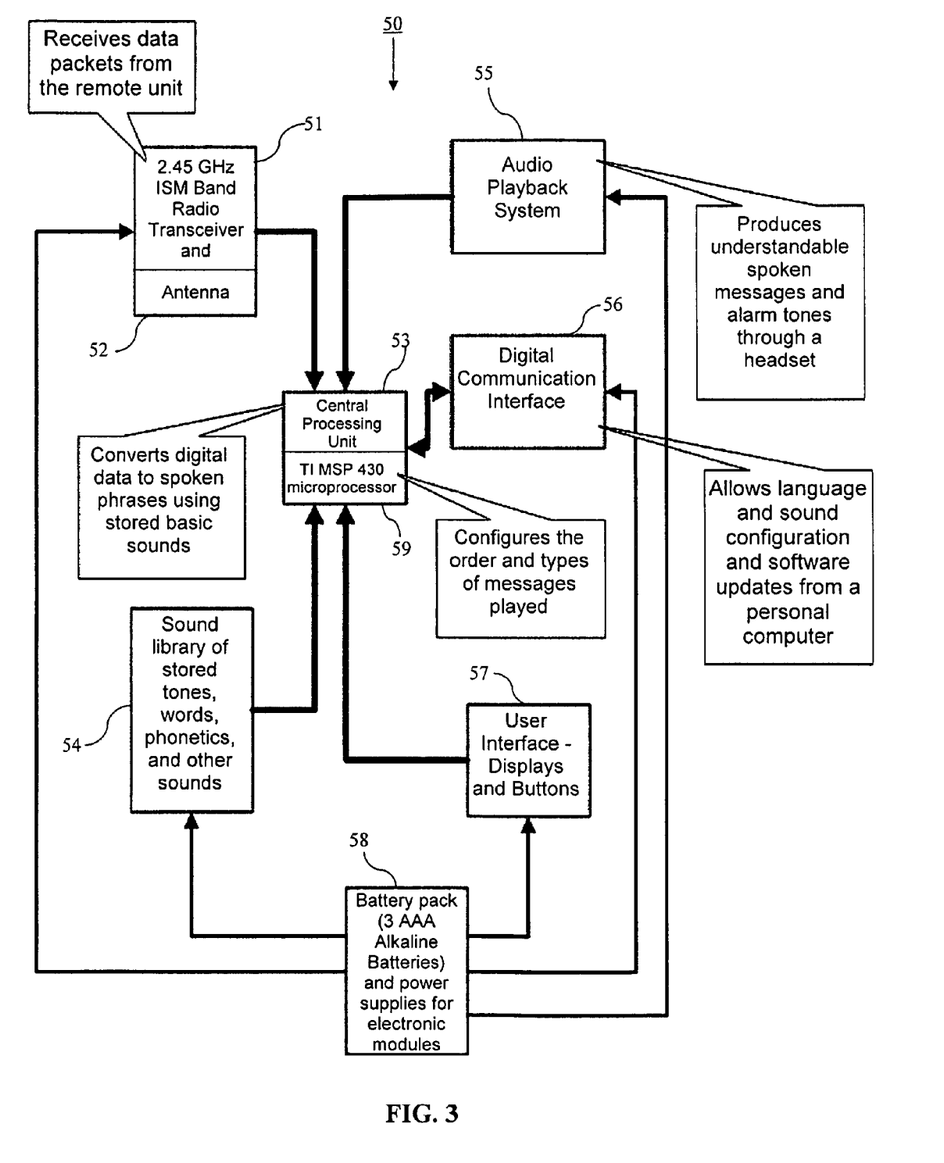
FIG. 3 shows a block diagram of an embodiment of a control station in accordance with the subject invention.

Utilized in conjunction with the remote station, a control station 50, as shown, for example, in FIGS. 1 and 3, receives information from the remote station and converts it into audio signals that can be perceived by an operator 15. Referring to FIG. 3, in this embodiment, the control station receives packaged data and information from the remote station. The data and information are processed by a control station central processing unit (CPU) that converts the data into sensory stimulation signals, such as visual, smell, touch, speech, tones, sounds and/or combinations thereof. The converted data is transmitted as a sensory stimulation signal, such as an audio signal to a sensory stimulation system. Examples of a sensory stimulation system include a vibrating chair, a vibrating device worn on the operator, an odor generator, a visual indicator device, an external speaker, an earplug, and a headset.

There are several methods and devices that can be used to allow the receiver station, or control station, to receive information from the remote station. As described above, in one embodiment, the remote station 30 utilizes a radio frequency transceiver 33 to transmit sensor 35 information and receive commands from the control station 50. Thus, in a particular embodiment, the control station 50 also utilizes a radio frequency transceiver 51 to receive information and transmit commands and information to the remote station 30. In a particular embodiment, the control, or receiver, station 50 has a transmitter that is capable of transmitting a control signal to a receiver on the remote station 30, where this control signal provides input for controlling the remote device. In an embodiment, this control signal provides input from the operator 15 for controlling the remote device 20. Infrared or other wireless signals can also be used. In a specific embodiment, the control station 50 utilizes a 2.45 GHz ISM band radio transceiver. In a further embodiment, one or more antennas 52 can be used to assist in receiving and transmitting signals from the remote station. In a further specific embodiment, the control station 50 uses an external antenna for signal integrity. However, the use of antennas is known to those with skill in the art and such a person would be able to determine an appropriate antenna for use with a specific embodiment of the subject invention.

Information and data received by the control station 50 from the remote station 30 must be analyzed and/or processed before it can be understood and used by the operator 15. To facilitate the processing and/or analysis, the control station can be operably connected to a central processing unit (CPU) 53, as shown, for example, in FIG. 3. In one embodiment, the control station utilizes a CPU of a personal computer (PC). In a specific embodiment, the PC is a laptop model for easy transport to a location. In addition, the CPU can be utilized to update or upgrade language or sound configurations of the control station, and make other changes to the operation of the control station. Operable connection to a CPU can be especially advantageous as a power source, if the control station 50 is to be used for an extended period, as will be discussed below.

In a particular embodiment, the central processing unit (CPU) 53 utilizes a proprietary microprocessor 59 configured to receive information from the remote station obtained from one or more sensors 33 positioned in and around the remote device 20, as described above. In one embodiment, the user station microprocessor is used to translate the received sensor data into audible sounds, alarms, or other notifications. In a particular embodiment, the microprocessor utilizes a stored sound library 54 of words, speech patterns, phonetic sounds, tones and other sounds, or combinations thereof, to convert the digital or other data from the remote station. In a specific embodiment, the microprocessor converts incoming digital data from the remote station into audible speech that can be perceived and understood by the operator. Advantageously, this can allow the operator to receive information about the status and condition of various aspects of the remote device 20 without directing their attention, especially visual attention, to the control station.

Figure 8:
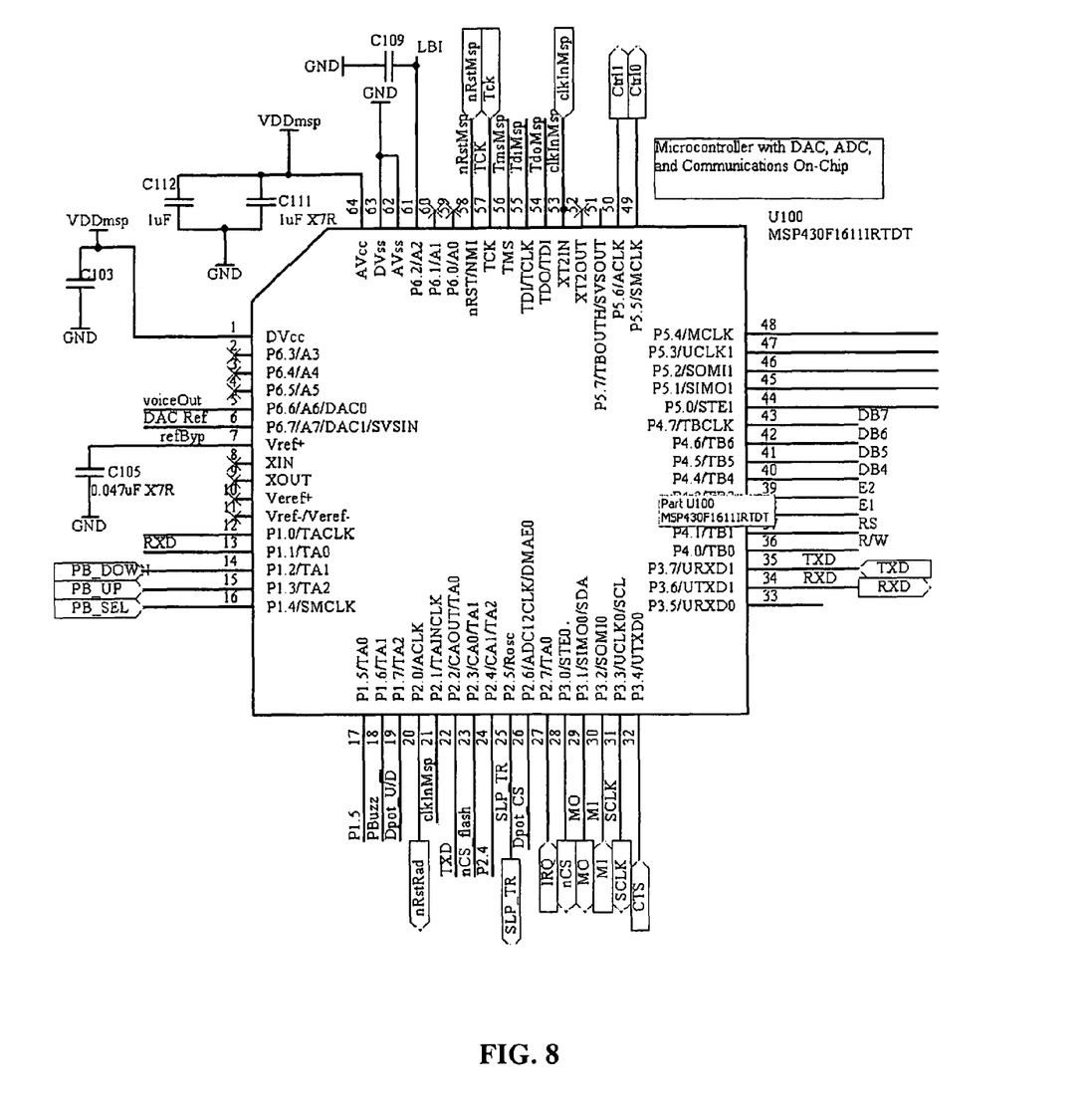
FIG. 8 shows a schematic of one embodiment of a microcontroller of a Control Station, of the subject invention.

In a further specific embodiment, the control station uses a Texas Instruments MSP430 microprocessor, as shown, for example, in FIG. 8. However, a person with skill in the art would be able to determine alternative microprocessors or CPU that could be utilized with the subject invention and such variations are considered to be within the scope of the subject invention.

The sound library 54, utilized by the central processing unit 53, can be stored on various types of CPU accessible memory, known to those with skill in the art. In one embodiment, the sound library 54 is stored on flash memory that can be accessed by a microprocessor to convert digital data, as described above. There can also be user settings and other system information that can be saved to accessible memory.

Utilized with the CPU 53, or microprocessor, is an audio playback system 55. In one embodiment, the playback system 55 makes use of a digital to analog converter (DAC). The DAC can translate audio data into the format that can be used by an audio transducer. In a further embodiment, the signal or sound from the audio transducer is transmitted through one or more speakers. In a specific embodiment, the signal or sound from the audio transducer is transmitted through headphones or headset. The audio playback system can contains a volume control subsystem, which can be necessary for different transducer and environmental configurations.

In computer systems, a communication interface can be, in general, an aggregate of devices and techniques utilized to interact with a computer system. In one embodiment, the subject invention employs a user interface 57 to present the operator with visual information regarding the remote device, such information being obtained and processed from the remote station. In a specific embodiment, a liquid crystal display (LCD) is utilized as at least part of the user interface 57, to provide secondary readings or the audio readings of the incoming information and/or data. Other components of the user interface allow for real time adjustment of operating and alert parameters, for example, adjusting volume, brightness of the LCD display, signal or alarm preferences or thresholds, as well as other parameters known to those with skill in the art.

A digital communication interface 56 can also be utilized with the subject invention to update software, configure language and/or sound and, in general, to receive or transmit other information. For example, a USB port can be utilized as a digital communication interface 56.

As with the remote station 30, the control station 50 requires a power source to operate. FIG. 3 shows an embodiment of a control station utilizing a battery pack 58 and an alternative power supply. The use of a battery pack can allow the control station to operate wirelessly. As mentioned above, the control station can also be operably connected to a personal computer, such as a laptop, for receiving and processing data from the remote station. The system power of the personal computer can also be supplied to the control station, such as, for example, by an operable connection through a universal serial bus (USB) interface. The USB can also be utilized to update or upgrade software, settings or other configurations of the control station.

FIG. 1 illustrates an embodiment wherein the control station is a separate component from the remote device control console. In an alternative embodiment, the control station and the remote device control console can be incorporated into a single unit.

It should be understood that the examples and embodiments described herein are for illustrative purposes only and that various modifications or changes in light thereof will be suggested to persons skilled in the art and are to be included within the spirit and purview of this application.

The description in the subject application discloses that the subject invention is particularly useful in the field of remote controlled devices, in particular remote controlled vehicles. However, a person with skill in the art will be able to recognize numerous other uses that would be applicable to the devices and methods of the subject invention. While the subject application describes a use for receiving information regarding the status of a remote controlled vehicle, other modifications and uses apparent to a person with skill in the art and having benefit of the subject disclosure are contemplated to be within the scope of the present invention.

The terms "operator" or "user" as used in the subject invention are merely for literary convenience. The terms should not be construed as limiting in any way. The devices, apparatuses, methods, techniques and/or procedures of the subject invention could be utilized by any person desiring or needing to do so and having the necessary skill and understanding of the invention.

Also, as used herein, and unless otherwise specifically stated, the terms "operable communication" and "operably connected" mean that the particular elements are connected in such a way that they cooperate to achieve their intended function or functions. The "connection" may be direct, or indirect, physical or remote.

The examples and embodiments described in the application are intended to be illustrative only since numerous modifications and variations therein will be apparent to those skilled in the art. As used in the specification and in the claims, the singular for "a," "an" and "the" include plural referents unless the context clearly dictates otherwise.

All patents, patent applications, provisional applications, and publications referred to or cited herein are incorporated by reference in their entirety, including all figures and tables, to the extent they are not inconsistent with the explicit teachings of this specification.

We claim:

1. A remote device locating system, comprising:
   a remote device;
   a remote station positioned on the remote device, wherein the remote station comprises:
      a transmitter, wherein the transmitter transmits a signal; and
   a receiver station, wherein the remote device is physically separated from the receiver station;
   wherein the receiver station comprises:
      a receiver, wherein the receiver receives the signal from the transmitter;
      a user sensory stimulation system, wherein the user sensory stimulation system decodes a location of the remote device from the signal and presents at least one sensory stimulation to a user, wherein the at least one sensory stimulation is related to the location of the remote device.

2. The system according to claim 1, wherein the remote station further comprises:
   at least one sensor, wherein the at least one sensor gathers information pertaining to the remote device,
   wherein a signal incorporates the information from the at least one sensor;
   wherein the user sensory stimulation system decodes the information from the signal and presents at least one sensory stimulation to a user, wherein the at least one sensory stimulation is related to the information from the signal.

3. The system according to claim 2, further comprising:
   at least one additional remote device;
   a corresponding at least one additional remote station, each of the at least one additional remote station comprises:
      at least one additional sensor, wherein the at least one additional sensor gathers at least one additional information pertaining to the at least one additional remote device,
      at least one additional transmitter, wherein the additional transmitter transmits at least one additional signal incorporating the at least one additional information from the at least one additional sensor,
   wherein the receiver receives the at least one additional signal from the additional transmitter, wherein the user sensory stimulation system decodes the at least one additional information from the at least one additional signal and presents at least one additional sensory stimulation to the user, wherein the at least one additional sensory stimulation is related to the at least one additional information from the at least one additional signal.

4. The system according to claim 2, wherein the remote station further comprises a first central processing unit capable of receiving the information gathered by the at least one sensor.

5. The system according to claim 4, wherein the first central processing unit is capable of processing the information received from the at least one sensor.

6. The system according to claim 4, wherein the remote station further comprises a first central processing unit accessible memory for receiving and storing information from the at least one sensor.

7. The system according to claim 6, wherein the first central processing unit accessible memory is nonvolatile.

8. The system according to claim 4, wherein the remote station further comprises a user interface in operable connection with the first central processing unit.

9. The system according to claim 4, wherein the remote station further comprises at least one sensor expansion connector capable of relaying information to the first central processing unit.

10. The system according to claim 4, wherein the receiver station comprises a second central processing unit capable of receiving the received signal from the receiver and decoding the information from the received signal.

11. The system according to claim 10, wherein the receiver station further comprises a user interface in operable connection with the second central processing unit.

12. The system according to claim 11, wherein the user interface allows the user to provide input for controlling the remote devices.

13. The system according to claim 11, wherein the user interface allows the user to request desired information.

14. The system according to claim 1, wherein the receiver is physically separated from the user.

15. The system according to claim 1, wherein the receiver is positioned on the user.

16. The system according to claim 1, wherein the receiver is attached to a headset, wherein the headset is designed to be worn by the user.

17. The system according to claim 1, wherein the user sensory stimulation system comprises a sound speaker.

18. The system according to claim 17, wherein the sound speaker is attached to a headset, wherein the headset is designed to be worn by the user so as to deliver sound to the user via the sound speaker.

19. The system according to claim 1, wherein the receiver station further comprises a second transmitter, wherein the remote station further comprises a second receiver, wherein the second transmitter transmits a control signal to the second receiver, wherein the control signal provides input for controlling the remote device.

20. The system according to claim 19, wherein the control signal provides user input for controlling the remote device.

21. The system according to claim 1, wherein the remote device is stationary.

22. The system according to claim 1, wherein the remote device is a terrain vehicle.

23. The system according to claim 1, wherein the remote device is an air vehicle.

24. The system according to claim 1, wherein the remote device is a water vehicle.

25. The system according to claim 1, wherein the at least one sensory stimulation comprises at least one audible stimulation.

26. The system according to claim 25, wherein the at least one sound comprises a voice.

27. The system according to claim 25, wherein the at least one sound comprises words.

28. The system according to claim 1, wherein the at least one sensory stimulation comprises at least one touch stimulation.

29. The system according to claim 1, wherein the at least one sensory stimulation comprises at least one smell.

30. The system according to claim 1, wherein the at least one sensory stimulation comprises at least one visual stimulation.

31. A method of locating a remote device, comprising:
positioning a remote station on a remote device, wherein the remote station comprises:
a transmitter, wherein the transmitter transmits a signal; and
positioning a receiver station physically separated from the remote device;
wherein the receiver station comprises:
a receiver, wherein the receiver receives the signal from the transmitter; and
a user sensory stimulation system, wherein the user sensory stimulation system decodes a location of the remote device from the signal,
presenting at least one sensory stimulation to a user, wherein the at least one sensory stimulation is related to the location of the remote device.

32. The method according to claim 31,
wherein the remote station further comprises:
at least one sensor, wherein the method further comprises:
gathering information pertaining to the remote device via the at least one sensor; and
transmitting a signal incorporating the information from the at least one sensor.

33. The method according to claim 31, wherein the receiver is physically separated from the user.

34. The method according to claim 31, wherein the receiver is positioned on the user.

35. The method according to claim 31, wherein the receiver is attached to a headset, wherein the headset is designed to be worn by the user.

36. The method according to claim 31, wherein the user sensory stimulation system comprises a sound speaker.

37. The method according to claim 36, wherein the sound speaker is attached to a headset, wherein the headset is designed to be worn by the user so as to deliver sound to the user via the sound speaker.

38. The method according to claim 31, wherein the receiver station further comprises a second transmitter, wherein the remote station further comprises a second receiver, wherein the second transmitter transmits a control signal to the second receiver, wherein the control signal provides input for controlling the remote device.

39. The method according to claim 38, wherein the control signal provides user input for controlling the remote device.

40. The method according to claim 31, wherein the remote device is stationary.

41. The method according to claim 31, wherein the remote device is a terrain vehicle.

42. The method according to claim 31, wherein the remote device is an air vehicle.

43. The method according to claim 31, wherein the remote device is a water vehicle.

44. The method according to claim 31, wherein the at least one sensory stimulation comprises at least one audible stimulation.

45. The method according to claim 44, wherein the at least one sound comprises a voice.

46. The method according to claim 44, wherein the at least one sound comprises words.

47. The method according to claim 31, wherein the at least one sensory stimulation comprises at least one touch stimulation.

48. The method according to claim 31, wherein the at least one sensory stimulation comprises at least one smell.

49. The method according to claim 31, wherein the at least one sensory stimulation comprises at least one visual stimulation.

50. The method according to claim 31, wherein the remote station further comprises a first central processing unit capable of receiving the information gathered by the at least one sensor.

51. The method according to claim 50, wherein the first central processing unit is capable of processing the information received from the at least one sensor.

52. The method according to claim 50, wherein the remote station further comprises a first central processing unit accessible memory for receiving and storing information from the at least one sensor.

53. The method according to claim 52, wherein the first central processing unit accessible memory is nonvolatile.

54. The method according to claim 50, wherein the remote station further comprises a user interface in operable connection with the first central processing unit.

55. The method according to claim 50, wherein the remote station further comprises at least one sensor expansion connector capable of relaying information to the first central processing unit.

56. The method according to claim 50, wherein the receiver station comprises a second central processing unit capable of receiving the received signal from the receiver and decoding the information from the receiving signal.

57. The method according to claim 56, wherein the receiver station further comprises a user interface in operable connection with the second central processing unit.

58. The method according to claim 57, wherein the user interface allows the user to provide input for controlling the remote devices.

59. The method according to claim 57, wherein the user interface allows the user to request desired information.

* * * * *

UNITED STATES PATENT AND TRADEMARK OFFICE
CERTIFICATE OF CORRECTION

PATENT NO.        : 8,674,813 B2                                            Page 1 of 1
APPLICATION NO.   : 12/406810
DATED             : March 18, 2014
INVENTOR(S)       : John F. Alexander et al.

It is certified that error appears in the above-identified patent and that said Letters Patent is hereby corrected as shown below:

In the Specification

Column 5,
Line 54, "J/O devices" should read --I/O devices--.

Column 7,
Line 10, "In a farther" should read --In a further--.
Line 13, "and, farther," should read --and, further,--.

Signed and Sealed this
Eighth Day of July, 2014

Michelle K. Lee
*Deputy Director of the United States Patent and Trademark Office*